J. A. WESER, DEC'D.
E. L. WESER, ADMINISTRATRIX.
GRAPHOPHONE.
APPLICATION FILED JUNE 27, 1916.

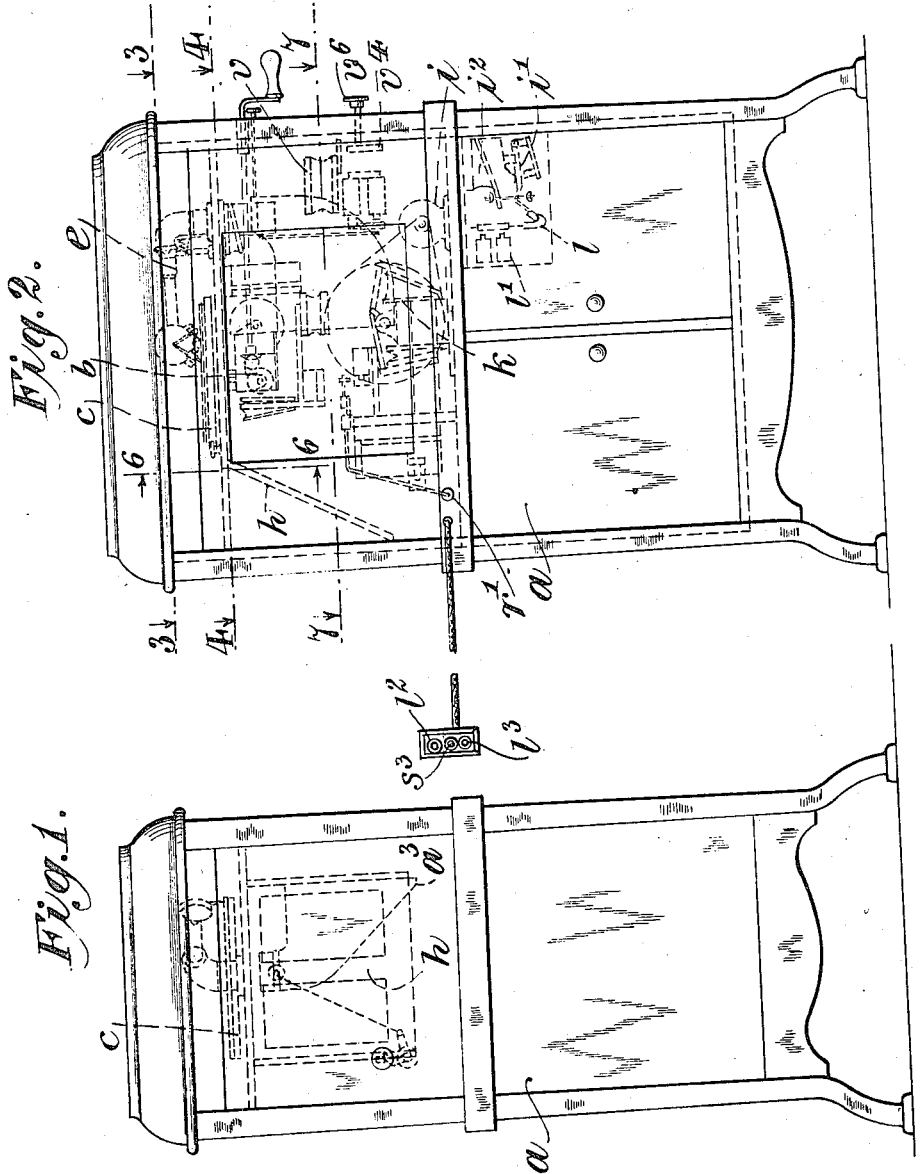

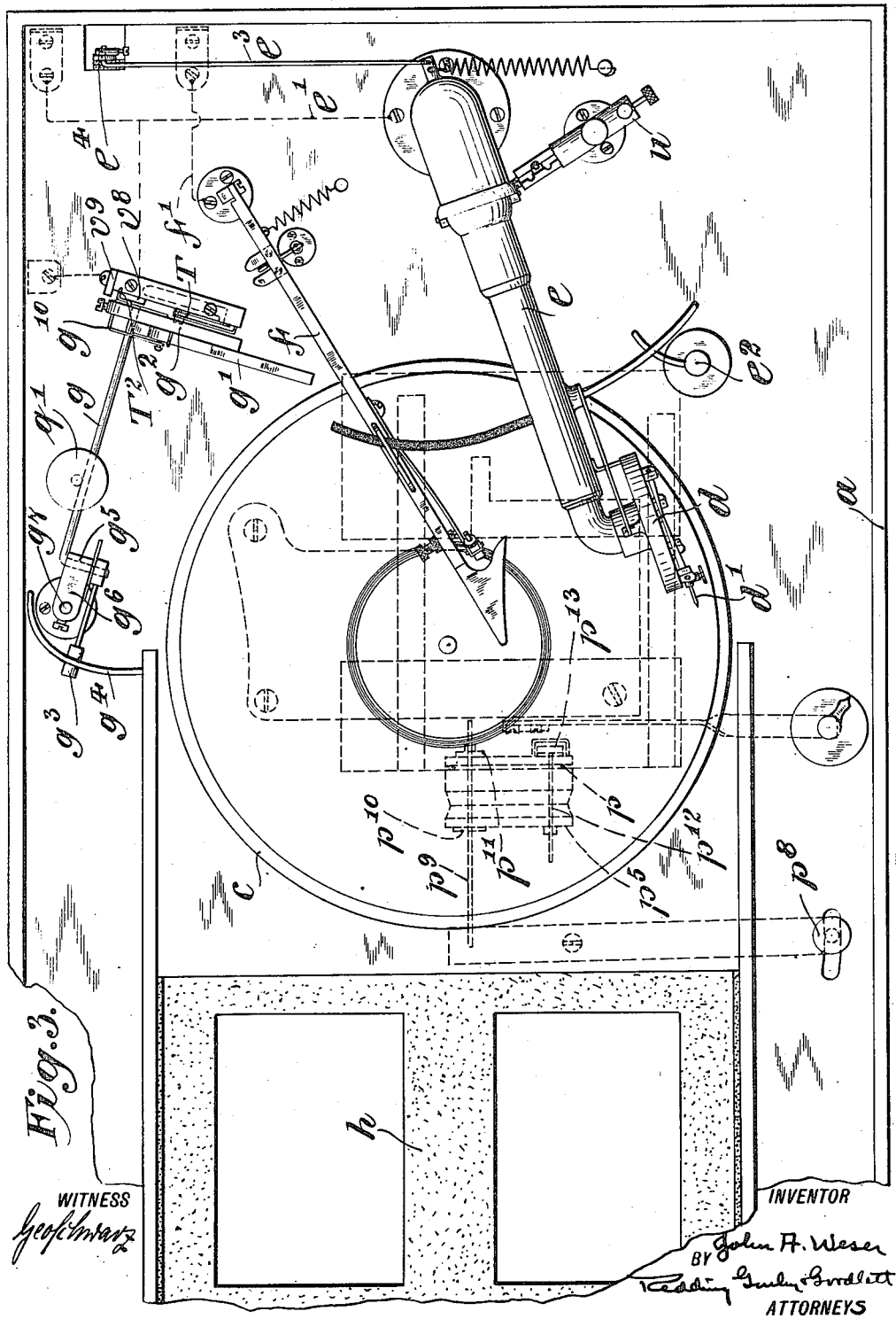

1,289,584.

Patented Dec. 31, 1918.
8 SHEETS—SHEET 3.

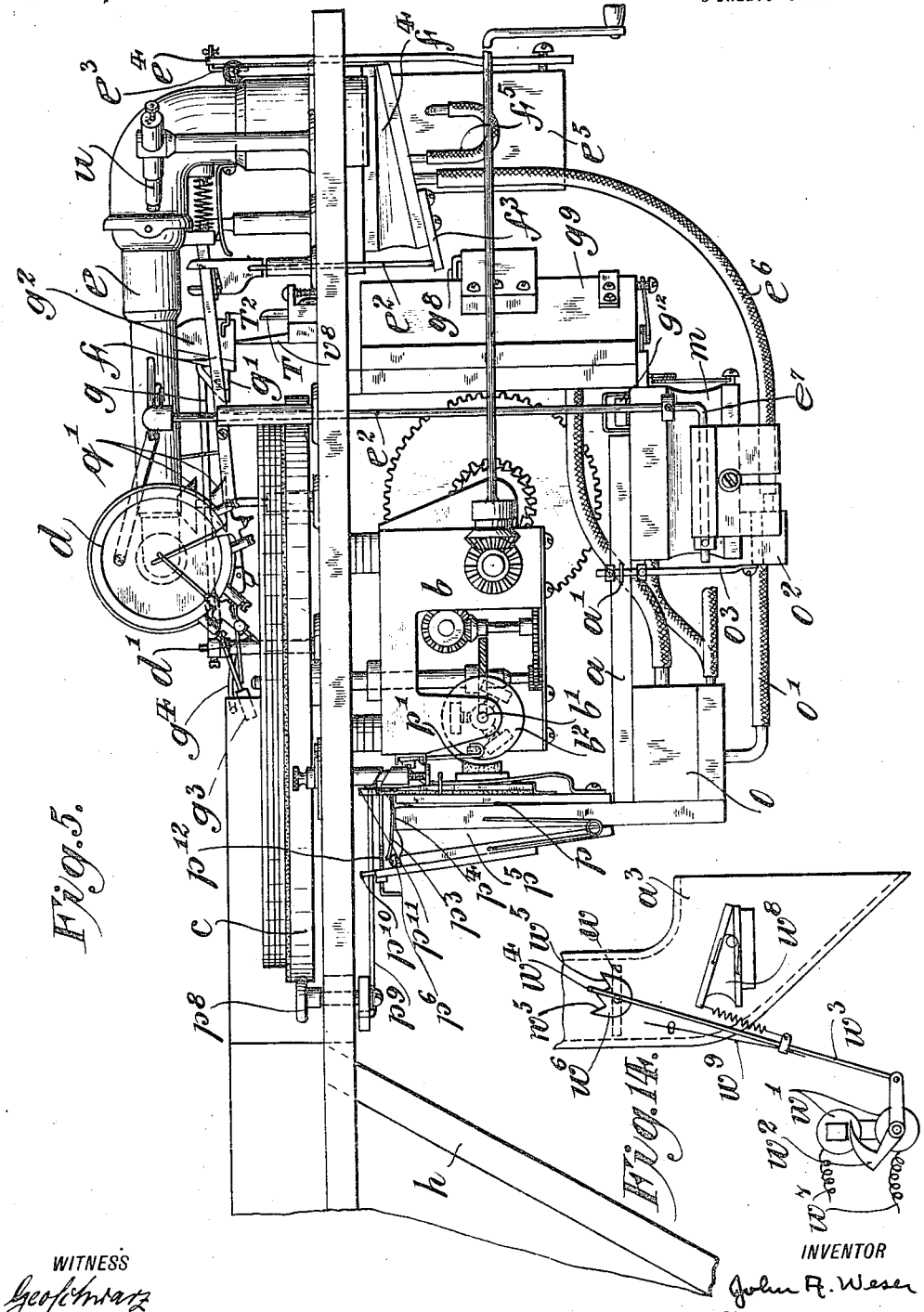

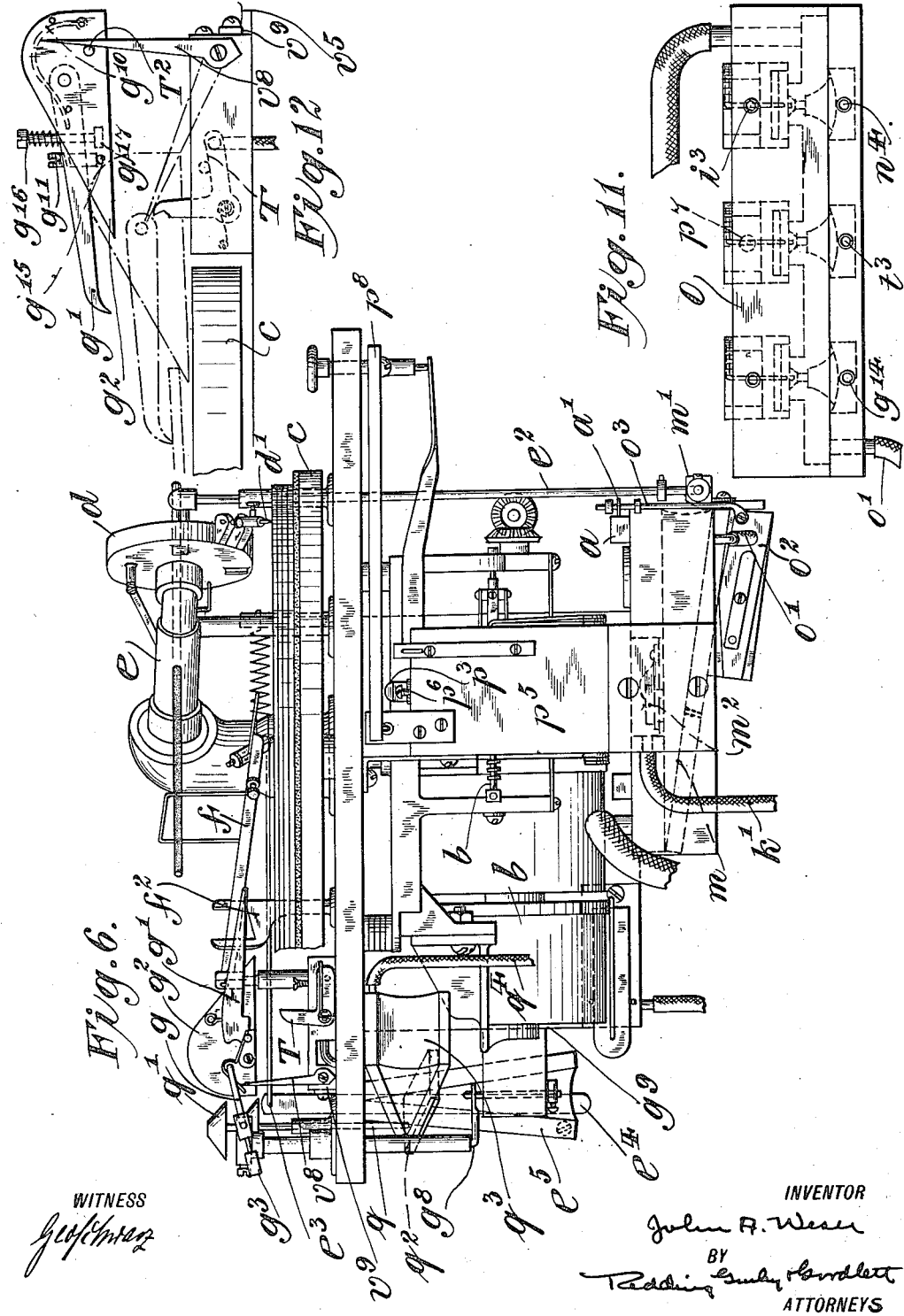

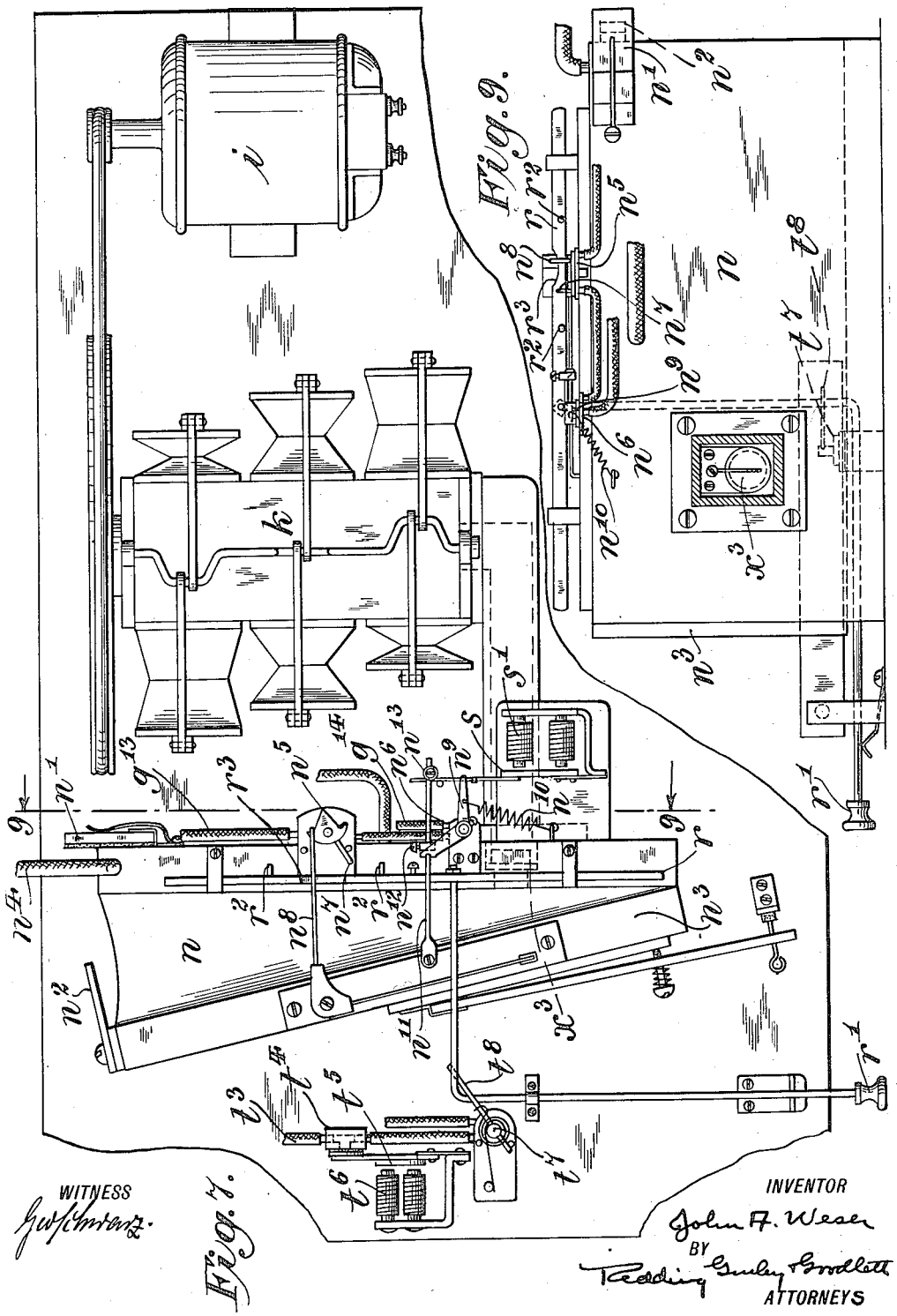

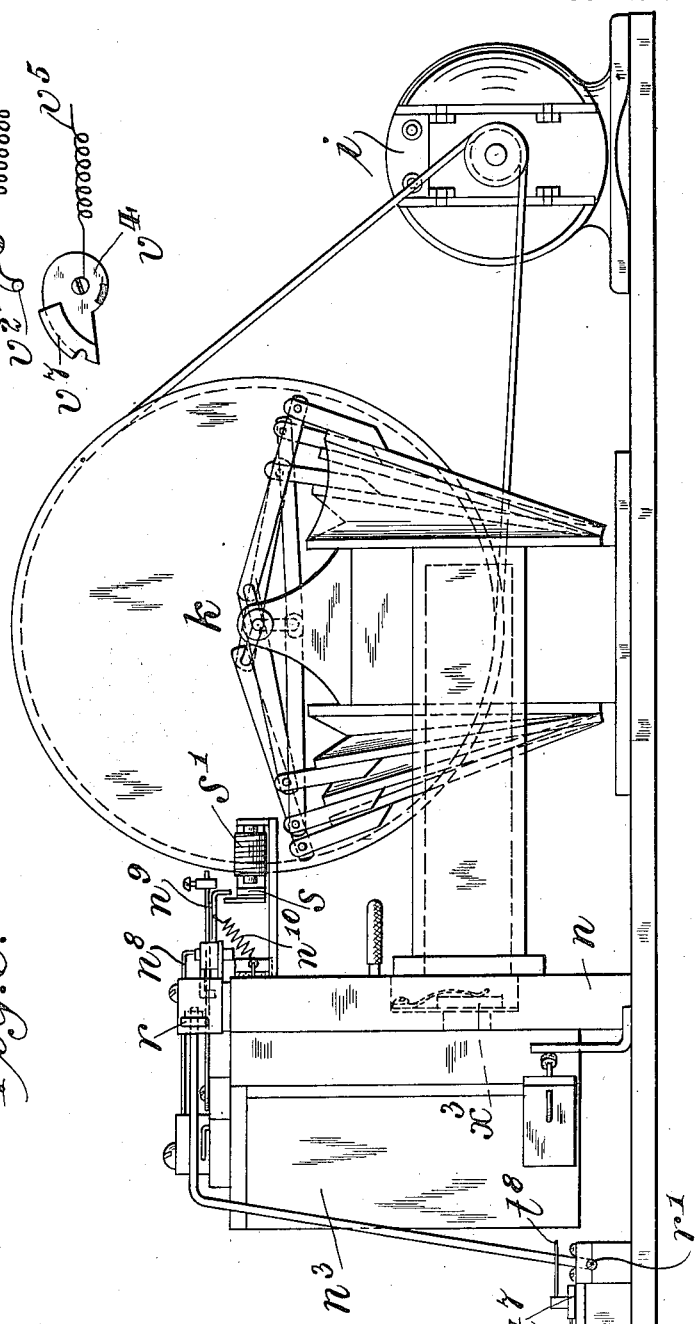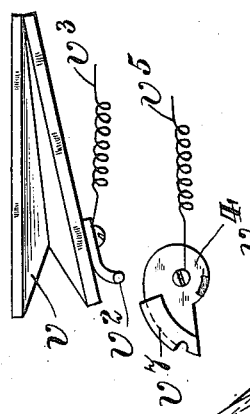

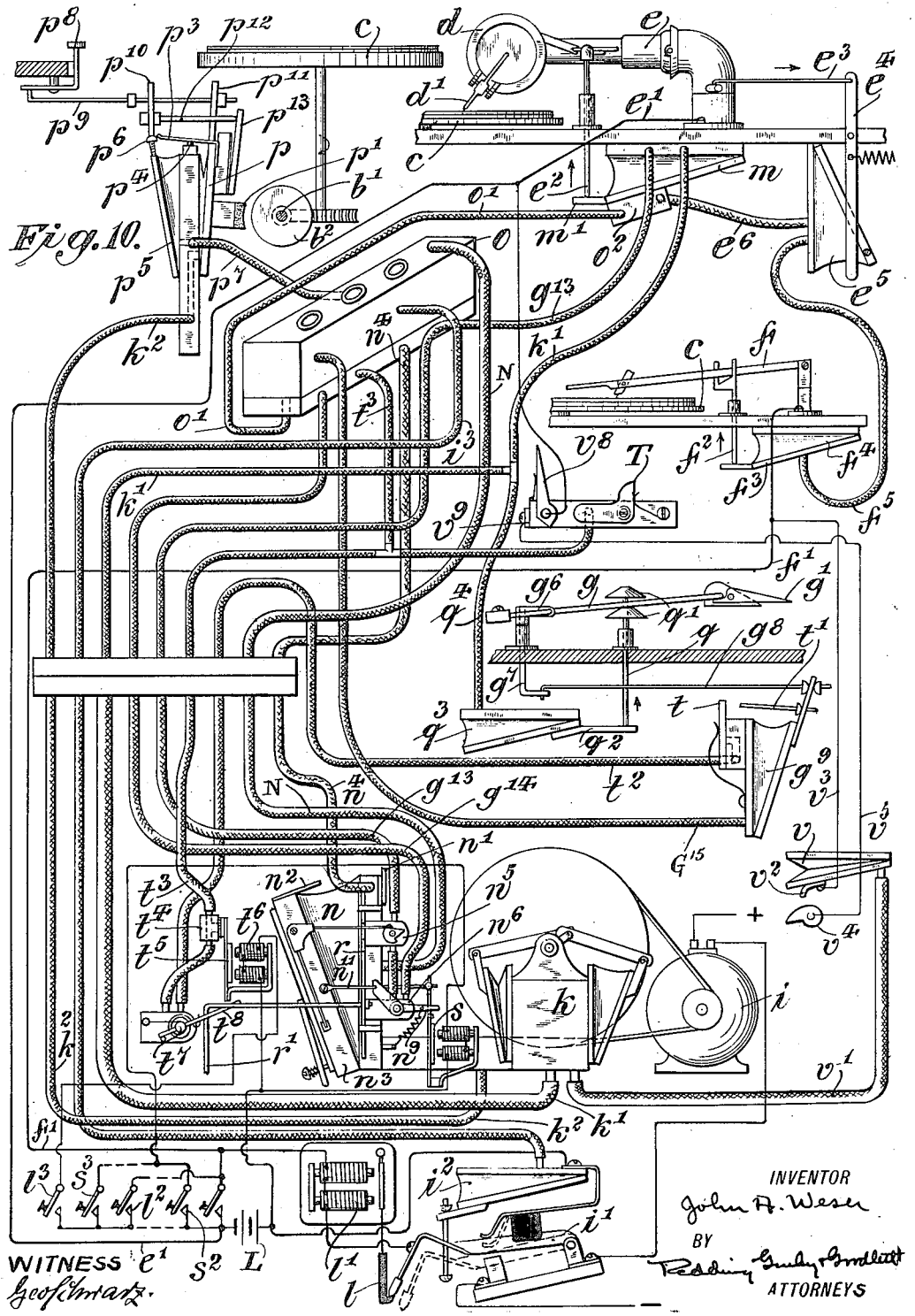

UNITED STATES PATENT OFFICE.

JOHN A. WESER, OF NEW YORK, N. Y.; ELSIE L. WESER, ADMINISTRATRIX OF SAID JOHN ALBERT WESER, DECEASED, ASSIGNOR TO WESER BROS. INC., OF NEW YORK, N. Y., A CORPORATION OF NEW YORK.

GRAPHOPHONE.

1,289,584.     Specification of Letters Patent.     Patented Dec. 31, 1918.

Application filed June 27, 1916. Serial No. 106,100.

*To all whom it may concern:*

Be it known that I, JOHN A. WESER, a citizen of the United States, and a resident of the borough of Manhattan of the city of New York, in the State of New York, have invented certain new and useful Improvements in Graphophones, of which the following is a specification, reference being had to the accompanying drawings, forming a part hereof.

This invention relates to graphophones and has for its general object to provide a machine in which the usual operations are effected automatically and controlled by electrical devices. More particularly, the invention is concerned with a talking machine in which the usual operations of starting, stopping, etc., are brought about by pneumatics connected mechanically to the appropriate elements of the machine and controlled by suitable means operatively disposed with relation to the pneumatic system. The invention is further concerned with a machine in which continuous playing of a series of superposed records may be brought about automatically. Still another feature of the invention has to do with the provision of electric controlling means, disposed at any desired distance from the cabinet for initiating the operations of the graphophone, and particularly the starting and stopping thereof. Still another object is to provide in a machine of the character described, an automatic time interval playing device operable at predetermined intervals to initiate operation of the devices for playing the record. Still another object is to provide in association with pneumatic stopping devices for a graphophone, electric means operable automatically at the end of a record, for initiating movement of the said pneumatics. The invention further provides, in association with automatic devices for playing continuously a series of superposed records, means operable automatically at the end of the playing of the lowermost record to initiate operation of the stopping devices for the turn-table. These means are suplemented where the automatic time interval devices are employed, by additional devices operable therewith to interrupt the circuit of said time interval devices after the playing of the lowermost of a series of superposed records. In addition to the objects briefly stated above, the invention seeks to improve many of the details of construction of the mechanical devices employed in effecting the desired automatic operation and coöperation of the several pneumatics and for transmitting the power thereof to the element sought to be controlled or actuated. The system of pneumatics employed for accomplishing the desired automatic actuation of the usual parts of a graphophone and the details of construction of the associated mechanical elements will appear in greater detail in connection with the description of the illustrated embodiment shown in the accompanying drawings, in which—

Figure 1 is a view in side elevation of a cabinet in which the improved graphophone is mounted.

Fig. 2 is a view in front elevation of the cabinet shown in Fig. 1 and indicating the portability of the electrical controlling devices.

Fig. 3 is a detail fragmentary view taken along the plane indicated by the line 3—3 of Fig. 2 and looking in the direction of the arrows and showing a graphophone embodying the invention.

Fig. 5 is a view in side elevation of the machine shown in Fig. 3, the side wall of the cabinet being removed.

Fig. 6 is a view similar generally to Fig. 5, but looking at the parts along the plane indicated by the line 6—6 of Fig. 2 and looking in the direction of the arrows.

Fig. 7 is a detail view on a larger scale of the air pump and the master bellows.

Fig. 8 is a view in side elevation of the parts shown in Fig. 7.

Fig. 9 is a detail view in elevation of the fixed member of the master bellows and showing particularly the pull rod for controlling certain of the air valves and its associated elements.

Fig. 10 is a schematic view of the improved graphophone showing particularly the pneumatic connections between the various pneumatics of the system and the operative mechanical connections between such pneumatics and the respective elements to be controlled.

Fig. 11 is a detail view of the valve chest for various secondaries.

Fig. 12 is a detail view of an improved shifting arm for throwing the records from the turn-table.

Fig. 13 is a detail view of one form of time interval controlling devices.

Fig. 14 is a detail view of an improved sound damper for the sound channel.

Figure 4:
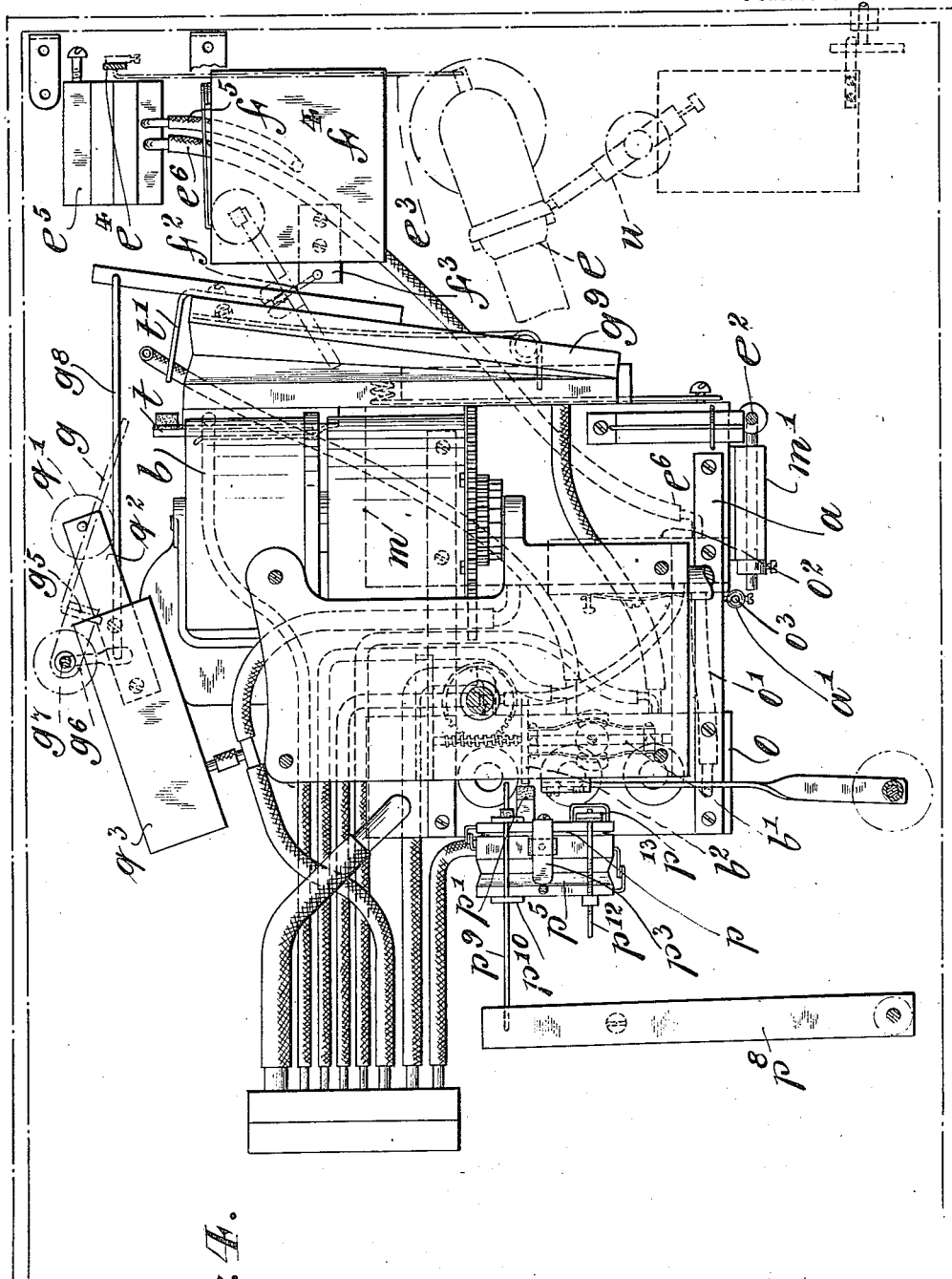
Fig. 4 is a detail view taken on the plane indicated by the line 4—4 of Fig. 2 and looking in the direction of the arrows and showing the parts of the improved graphophone immediately under the turn-table.

The invention is not to be limited to any particular sort of cabinet for the improved devices, although it will be evident from Figs. 1 and 2 that it will be desirable to have this cabinet $a$ of such shape and dimensions as to house the parts in convenient and compact relationship and, so far as desirable, entirely out of view. The elements of the machine include, as usual, a suitable prime mover $b$, shown as a spring motor, for the turn-table $c$ on which rests the record to be played, and the sound box $d$ with the needle $d'$, both carried on the swinging tone arm $e$ through which the sound passes into the sound chamber in a manner well understood. With the tone arm $e$ is mounted an improved swinging finder arm $f$, which is the subject of a co-pending application, Serial No. 106,099 filed June 27, 1916, the position of which is always such that the tone arm will contact therewith at the end of the playing of a record and complete an electrical circuit through the leads $f'$, $e'$, to bring about the stoppage of the machine in a manner hereinafter to be described. Alongside of the finder arm $f$ is mounted a swinging shifter arm $g$, one end of which carries coöperating fingers $g'$, $g^2$ (Fig. 12) and the other end of which is operatively connected to a pneumatic to bring about the shifting of the uppermost of a series of superposed records on the turn-table in a manner which will later appear. During the shifting operation, the tail $g^3$ of the shifting lever $g$ runs along an inclined fixed guide plate $g^4$ and is depressed so as to lift the other end of the shifting lever and the record and thereby facilitate its discharge to the receiving pocket $h$.

The invention consists, broadly, in the association with the usual elements of a graphophone of automatic devices to effect the various movements thereof in such manner as to effect, in any desired combinations, the starting, stopping, playing, repeating, shifting or continuous playing, as may be elected before the machine is set in motion. It resides further in the association with such automatic means of electrical devices for initiating movement of these automatic devices, either on the machine itself or from a distance. It further resides in the provision, in combination with the automatic devices, of a time interval playing device which takes the place of the starting button, when set, and serves to bring about regularly, at predetermined time intervals, any predetermined cycle of movements of the automatic devices, according to the condition in which they are set. The automatic devices employed are pneumatics and the system is one of air control, while, in the illustrated embodiment of the invention, it is proposed to create the necessary differential pressures throughout the pneumatic system by a pump driven by an electric motor, the starting and stopping of which is controlled automatically by a separate pneumatic placed in the pneumatic system. It is to be noted further that a spring motor of the usual form has been shown for driving the turn-table, but it will be understood that, if desired, an electric motor might be employed as the prime mover with equal convenience and the circuit of such a motor might be controlled automatically in much the same manner described with respect to the circuit of the motor for the pump. However, as this description proceeds, it will be evident that the invention is not to be limited to the details of construction of any of the parts thus far referred to, since equivalent devices for performing the corresponding functions may be used. However, the invention does contemplate the provision of a system of automatic control of the usual movements of a graphophone by means of a series of pneumatics so controlled and coördinated, as to bring about at the proper times the desired operations. Having in mind, then, this broad view of the invention and the comprehensive relation of controlling pneumatics which it contemplates, reference may be had to the schematic view in Fig. 10 wherein is shown clearly one construction and relative disposition of pneumatics, reproducing elements and controlling valves, effective for the realization of the objects and advantages to be attained by the employment of the novel system now to be described.

The usual operations connected with the playing of a record on a graphophone may roughly be divided into the lowering of the needle to the face of the record, the starting and stopping of the record, the lifting of the needle from the record after it has been played, and the swinging of the tone arm with the sound box to initial position for replaying. To these operations, there has been added in the improved machine, the shifting of a record, so that a series of records may be placed on the turn-table in superposed position and successively shifted after playing in order that the next record may be played, either immediately, or at some subsequent time, depending upon the setting of the automatic devices, as will later appear. The operations described are effected in accordance with the present invention by pneumatic devices and, accordingly, it is proposed that each element for effecting each of the named operations, shall be connected with a pneumatic, movement of which is initiated at the proper time by appropriate means to be referred to. The pressure differential at the various portions of the pneumatic system is created in the illustrated embodiment by a pump $k$ mounted in the cabinet $a$ and driven by an electric motor $i$, the circuit of which is completed through a swinging knife switch $i'$, the position of which is controlled by a swinging detent $l$ carried on the armature of suitable electromagnets $l'$, the circuit of which is completed through a starting button $l^2$ disposed at any point more or less remote from the cabinet, and through the leads $f'$, $e'$, of the finder arm and tone arm, respectively. Current for the local circuit of these electromagnets and others to be referred to is provided from a suitable source, such as a battery L, while the current for the motor $i$ may be derived from the mains. In parallel with the starting button $l^2$ which, as explained, may be disposed at different points, more or less remote from the cabinet, there may be connected a corresponding stopping button $l^3$, by which the magnets $l'$ may be energized at any time to trip the motor switch $i'$ and thereby bring about the operation of the pump $k$ for the purpose of actuating the appropriate controlling pneumatic for stopping the graphophone. From the description it will be evident that the motor $i$ can only be started by completing the circuit manually through the starting button $l^2$ or the stopping button $l^3$ or by contact of the tone arm with the finder arm, as at the end of a record, so that the operations later to be described will all be dependent upon control of the motor in one of these ways.

The lifting pneumatic $m$, that is, the pneumatic by which the sound box $d$ and the needle $d'$ are lifted from the face of the record or lowered thereonto, is disposed conveniently directly beneath the tone arm $e$ and connected with the tone arm by a vertically disposed reciprocating plunger rod $e^2$ which may rest on an extension $m'$ of one end of the movable member of the pneumatic $m$, so that when the pneumatic is collapsed the tone arm will be raised and vice versa. The pneumatic $m$ is connected directly to the pump $k$, through a conduit $k'$, whereby the pneumatic is always collapsed upon operation of the pump, to raise the needle $d'$ from the face of the uppermost record. The conduit $k'$, as shown in Fig. 6, communicates with the pneumatic $m$ through a check valve $m^2$ whereby the check valve is unseated whenever the motor $i$ is started, but seats immediately upon the stoppage of the motor to hold the vacuum in the pneumatic $m$ and thereby insure the relatively slow expansion of said pneumatic for the positioning of the tone arm and needle, as would result from the provision of a small bleed nipple only.

Since the pump $k$ need be actuated only for a relatively short time, at least sufficient for the several controlling pneumatics to effect their respective operations, and need not be operated during the playing of a record, it will be desirable to provide automatic devices for bringing about the interruption of the circuit of the motor $i$ as soon as the pump has created a sufficient pressure differential throughout the system to actuate said pneumatics. To this end there has been connected directly with the pump $k$ a master bellows $n$ by which, it may be said, the desired combinations of movements may be secured with the aid of electrical or manual setting devices. This master bellows $n$ carries thereon a leaf primary valve $n'$, arranged to be unseated upon the collapse of the bellows $n$ by the engagement therewith of a finger $n^2$ on the movable member $n^3$ of the bellows. This primary controls, through a conduit $n^4$, the secondary in the valve chest $o$ for the motor cut-out pneumatic $i^2$ by which the motor knife switch $i'$ is controlled. In this way, immediately upon the collapse of the master bellows $n$ the motor $i$ and pump $k$ are stopped and the bellows $n$ is relied upon, during its expansion to maintain a sufficient pressure differential in the system to complete the movements of such pneumatics as are to be actuated. The motor cut-out pneumatic is connected to the valve chest through a conduit $i^3$. Between the pump $k$ and the master bellows $n$ there is interposed a check valve $x^3$ which seats and cuts off communication between the pump and the bellows whenever the pump is stopped. In this way the action of the respective pneumatics connected directly to the pump and to the bellows is dependent only upon the condition of the particular device to which they are connected and not upon the condition of the other device. Further the vacuum in the master bellows $n$ is better maintained by having it cut off from the pump when the latter is inactive.

A brake pneumatic $p$ provided with a suitable shoe $p'$ is arranged to coöperate with the edge of a suitable disk $b^2$ on the drive shaft $b'$ of the prime mover for the turn-table $c$. This pneumatic may be collapsed to release the brake and permit rotation of the turn-table by suction exerted directly thereon through a conduit $k^2$ which leads directly to the pump $k$. On the movable member of the brake pneumatic $p$ are carried suitable devices for holding it in collapsed position to permit free rotation of the turn-table $c$ and these devices, in the illustrated embodiment, comprise a spring detent $p^3$ arranged to engage with a fixed stud $p^4$ on the fixed section of the pneumatic whereby the pneumatic may be held in collapsed position. In order to trip the detent $p^3$, as when rotation of the prime mover shaft $b'$ is to be stopped, there has been provided a duplicate pneumatic $p^5$ mounted with the brake pneumatic and carrying an adjustable stud $p^6$ for engagement with the detent $p^3$ when such duplicate pneumatic is collapsed. When collapsed, the detent $p^3$ is disengaged from the stud $p^4$ and the brake pneumatic is free to expand to apply the brake $p'$. The tripping pneumatic $p^5$ is connected operatively through a conduit $p^7$ with a secondary in the valve chest $o$ to be controlled in any one of the several ways hereinafter to be described, as when rotation of the turn-table is to be stopped. Manual control of the brake $v'$ is provided so that the machine may be stopped and started at will, in much the usual manner. This manual control may be had conveniently through a hand lever $p^8$ connected through linkage $p^9$ to fingers $p^{10}$ and $p^{11}$ carried on the movable member of the pneumatics $p^5$ and $p$ respectively, whereby either one of said pneumatics may be collapsed or expanded by positive actuation through said linkage $p^9$. With the movable member of the tripping pneumatic $p^5$ there is carried an adjustable rod $p^{12}$, the end of which is arranged to engage a safety relief valve $p^{13}$ on the brake pneumatic $p$ whenever the latter is collapsed, thereby admitting atmospheric pressure into such pneumatic for a reason which will be appreciated.

In association with the lifting of the tone arm $e$, as at the end of a record, there is naturally to be considered the swinging of this tone arm to its initial position and the repositioning of the finder arm $f$ on the blank portion at the center of the next record to be played. It is necessary, of course, to coördinate these two movements with the lifting movement given to the tone arm and to have them effected immediately upon the lifting of the tone arm, but not before. Accordingly, the initiation of movement of the actuating devices to effect the swinging of the tone arm and the positioning of the finder arm is made dependent upon the condition of the lifting pneumatic $m$. With the tone arm $e$ is connected operatively, as through a suitable link $e^3$ and lever $e^4$, a swinging pneumatic $e^5$, while operatively disposed with relation to the finder arm $f$ is supported a beveled lifting cam $f^2$ as on the movable member $f^3$ of a lifting pneumatic $f^4$. These pneumatics $e^5$ and $f^4$ are connected in series through a suitable conduit $f^5$. The pneumatic $e^5$ is connected in turn to the valve chest $o$ through conduits $e^6$ and $o'$, the communication of which is had through a swinging valve $o^2$ carried on the movable member of the lifting pneumatic $m$ for the tone arm $e$. This swinging valve is shown clearly in Figs. 5 and 6. Normally, when the lifting bellows $m$ is expanded, this valve $o^2$ lies in such position as to break the communication between the conduits $o'$ and $e^6$, but when the bellows $m$ is about collapsed, a link $o^3$ on the valve $o^2$ is brought into engagement with a fixed abutment $a'$ carried in the cabinet $a$, to swing the valve $o^2$ to an angular position in which the conduits $o'$ and $e^6$ are placed in communication and the suction in the valve chest $o$ is led into the pneumatics $e^5$ and $f^4$ to collapse them and swing the tone arm into initial playing position and reposition the finder arm $f$ in a manner which will be understood.

The devices thus far described may be used in combination to great advantage for the purpose of merely starting, stopping and replaying, without manual manipulation and it is to be understood that one phase of this invention, as expressed in the appended claims, resides in the provision of such automatic starting, stopping and replaying devices. However, there is shown herein a graphophone in which there are included additional elements for effecting additional operations which it may be convenient to bring about through automatic actuation and without manual manipulation save for the initial setting. One of such devices is the shifting means by which a played record may be thrown from the turn-table. These shifting devices will be of especial importance where, as is contemplated, a series of superposed records on the turn-table are to be played in succession. Obviously, where such shifting devices are incorporated, it is necessary that they be coordinated in their movements with the movements of the other controlling pneumatics described so that the record will be shifted at the proper time.

The shifting lever $g$ is pivoted, as at $g^5$ on a swinging arm $g^6$ carried with a vertically disposed rotatable spindle $g^7$, the lower end of which is connected through a link $g^8$ with the movable member of the shifting pneumatic $g^9$, whereby upon collapse of this pneumatic the shifting lever is swung inwardly with a substantially radial movement with respect to the record and the edge of the record is engaged between the coöperating fingers $g'$ and $g^2$, in the manner indicated in Fig. 12. It should be noted that these fingers $g'$ and $g^2$ of the shifting arm are held together yieldingly by a spring $g^{10}$. The distance between the fingers may be adjusted by means of a set screw $g^{11}$ in one finger $g'$ and abutting against a pin $g^{15}$ carried on the other finger. Given the proper relative setting of the fingers $g', g^2$ for disks of one character, the fingers may be adjusted by a single manipulation for disks of any character by means of a spring-pressed rocker stud $g^{16}$ on the lower end of which is carried a cam finger $g^{17}$ arranged to be moved into or out of position between the end of the set screw $g^{11}$ and its abutment $g^{15}$, the general purpose of the adjustment being to accommodate the fingers to different records. It may be found desirable to support the shifting lever $g$ positively, as by means of a vertically disposed rod $q$, on the upper end of which may be fixed one or more beveled supporting buttons $q'$ on which or between which may rest the lever $g$. The rod $q$ is carried on an extension $q^2$ of the movable member of a supporting pneumatic $q^3$, the collapse of which serves to lower the supporting buttons $q'$ and the lever $g$ until the finger $g'$ rests by gravity upon the face of the uppermost record. Normally, of course, the supporting pneumatic $q^3$ is in expanded position and the rod $q$ carried thereby is raised so as to hold the shifting lever $g$ with its fingers out of engagement with the face of the uppermost record. When the needle $d'$ is raised from the face of the record by the lifting pneumatic $m$, it is desirable that the shifting lever $g$ with its fingers be lowered into operative relation to the uppermost record for the shifting operation and it will be evident that this lowering movement may be carried on without interference with any of the other devices every time the lifting pneumatic $m$ is collapsed and that, too, even though the shifting pneumatic $g^9$ is not to be brought into play. Accordingly, it has been found convenient to connect the supporting pneumatic $q^3$ directly to the pump $k$ by a conduit $q^4$ which is formed as a branch of the conduit $k'$ between the pump and the lifting pneumatic $m$.

It will be evident that since the invention contemplates the carrying on of a series of operations automatically in any elected combination so as to effect any desired movements of a graphophone, the shifting pneumatic $g^9$ must be so connected in the pneumatic system and controlled as to be operable only as desired. For instance, where the same record is to be repeated, the shifting pneumatic must be cut out. Again, where the machine is to be stopped immediately after the shifting of a record and the succeeding record is not to be played until some subsequent time, it is desirable that the ordinary sequence of operations should not be permitted to include a shifting operation for each of the other operations. If it were, the shifting devices would come into play at each operation of the pump $k$ and would shift a record at the time the starting devices were coming into play to position the needle $d'$ for the playing of the record then shifted. Other playing conditions which will appear when the operation of the system is described, make it necessary to provide special devices for controlling the shifting pneumatic $g^9$. As shown, the primary valve $g^{12}$ for the throw pneumatic $g^9$ is carried with the lifting pneumatic $m$ for the tone arm $e$ and is unseated upon the collapse of this pneumatic as by the engagement therewith of an abutment $e^7$ carried adjustably on the lifting rod $e^2$. This primary valve $g^{12}$ is connected through a conduit $g^{13}$ with a cut off valve $n^5$ on the master bellows $n$ and through still another valve $n^6$ and conduit $g^{14}$ with a secondary in the valve chest $o$, the function of which is to control the conduit $G^{15}$ leading to the throw pneumatic $g^9$. The valves $n^5$ and $n^6$ on the master bellows $n$ are controlled in the manner hereinafter described. When these valves are opened, however, it will be evident that upon the collapsing of the lifting pneumatic $m$ the primary valve $g^{12}$ will be unseated and actuate, through the conduits $g^{13}$, $g^{14}$, the appropriate secondary for effecting the collapse of the throw pneumatic $g^9$, the function of which is to throw the shifting lever $g$ inwardly and discharge the uppermost record. As noted above, it is often times not desirable to have this throw pneumatic actuated as when it is desired to leave any particular record in position for being played. Since the primary valve $g^{12}$ is opened whenever the lifting pneumatic $m$ is collapsed, it is necessary to rely upon one of the valves $n^5$, $n^6$ on the master pneumatic $n$ for effecting this control and cutting out the throw pneumatic $g^9$ as required. The first named valve $n^5$ is controlled primarily by a manually operable pull rod $r$ (Figs. 7, 8, and 9) carried by a convenient handle $r'$ to facilitate its setting. The sliding rod $r$ carries two laterally projecting pins $r^2$, one of which is arranged to engage operatively a tripping arm $n^7$ on the throw valve $n^5$, according to the direction in which the rod is moved, for the purpose of throwing the valve $n^5$ to opened position or closed position. Secondarily, and under certain conditions of use, it may be said that the valve $n^5$ is controlled by the master bellows $n$, the movable member thereof having a yielding hook $n^8$ thereon which rests on the upper edge of the pull rod $r$ and may be permitted to move into operative relation with the throw valve $n^5$ by the springing of the hook into a depression $r^3$ in the upper edge of the rod. For convenience, it may be said that the push rod $r$ has an inner position, an outer position and a median position. When in the outer or inner position, the hook $n^8$ is forced upward out of operative relation to the valve $n^5$, while in the median position the hook rides down into the recess $r^3$ and rests against one of the beveled faces of the segment designated generally with the valve, as $n^5$. It is evident that these beveled faces are so disposed with relation to each other and to the hook that when the hook rests in the recess $r^3$ and the bellows $n$ is collapsed, the hook will, upon expansion of the bellows, engage the opposite beveled face of the segment $n^5$ and thereby throw the valve automatically from one position into another. The supplemental throw valve $n^6$ in the circuit of the throw valve $g^{12}$ has on its stem an elbow lever $n^9$ with one arm of which engages a spring $n^{10}$ to move the valve to open position whenever the other arm of the lever is free. Normally, the other arm is engaged and held retracted so that the valve remains in closed position, by means of a rod $n^{11}$ on the movable member of the master bellows $n$, through an adjustable abutment $n^{12}$ carried thereon intermediate its ends. At the extreme outer end of the rod $n^{11}$ is another adjustable abutment $n^{13}$ arranged to coöperate with a detent formed with the armature $s$ of an electromagnet $s'$. In operation, when the rod $n^{11}$ with the abutment $n^{12}$ is moved by the collapsing of the master bellows $n$, the elbow lever $n^9$ of the valve $n^6$ is released so that the spring $n^{10}$ becomes effective to open said valve. At this time the detent $s$ rests out of the path of the other arm of the elbow lever $n^9$. If now, it becomes desirable, under some conditions, as will be pointed out in connection with the description of the operation, to keep the valve $n^6$ closed, the magnet $s'$ may be energized by a suitable button $s^2$ in its circuit, so as to attract the armature $s$ and move the detent into the path of the lever $n^9$ and thereby hold the lever against a rocking movement under the influence of the spring $n^{10}$ upon the subsequent collapse of the master bellows $n$.

It now remains to describe the devices whereby initiation of the tripping bellows $p^7$ is effected for the purpose of disengaging the detent $p^3$ of the brake pneumatic $p$ from its stud $p^4$ and thereby permitting the brake $p'$ to go on and stop the rotation of the turn-table $c$. Usually, it may be supposed that it would be desirable to stop rotation of the turn-table after the shifting of each record and before the playing of a new record. Accordingly there has been placed on the throw pneumatic $g^9$ a primary valve $t$ which is unseated by a rod $t'$ carried on the movable member of the pneumatic whenever the pneumatic is collapsed to shift a record. This primary is in communication with the valve chest $o$ through conduits $t^2$ and $t^3$ and serves to control the secondary in the valve chest of the tripping pneumatic $p^5$, whereby whenever the primary $t$ is unseated the tripping pneumatic will be collapsed to apply the brake in the manner heretofore described. However, as will be understood, it is not always desirable to stop rotation of the turn-table $c$ through the throw devices, since it has been pointed out that the throw pneumatic $g^9$ itself is often cut out of the circuit and remains inactive. Or, again, it may be that rotation of the turn-table is continued during and after the operation of the throw devices. To meet all such conditions there has been introduced in one of the conduits $t^3$ of the secondary for the tripping pneumatic $p^5$ another primary $t^4$ mounted on an armature $t^5$ of an electromagnet $t^6$, the circuit of which is controlled by the stop buttons $l^3$ first described. Upon energizing the magnet $t^6$, the primary $t^4$ will be unseated to actuate the secondary of the tripping pneumatic $p^5$ for the purpose of stopping rotation of the turn-table. This additional primary $t^4$ is merely supplemental to the other primary $t$ and does not prevent the primary $t$ from operating in the manner described to bring about the stoppage of the turn-table $c$. As suggested before, however, in continuous playing, it is necessary to cut the primary $t$ out of the circuit of the secondary for the tripping pneumatic $p^5$. This is done by placing between the conduits $t^2$ and $t^3$ a valve $t^7$ which is normally held open by a spiral spring, but which may be closed by the engagement with a finger $t^8$ on its stem with the handle $r'$ of the pull rod $r$ whereby, when the pull rod is pulled to its outer position, the handle $r'$ picks up the finger $t^8$ on the valve $t^7$ and closes this valve, thereby interrupting communication between the primary $t$ and the secondary of the tripping pneumatic $p^5$. Upon the collapsing of the throw pneumatic $g^9$ under these conditions, the uppermost record will be shifted but the turn-table will not be stopped, so the next record will be played immediately.

Thus far it has been sought only to describe, as briefly as clarity would permit, the elements by which the various operations and controls are accomplished without attempting to set out in great detail the very intimate operative relationship between all of these elements and the many different conditions which they might assume with respect to one another under various settings by the operator. A description of this relationship and the coöperation of the elements whereby that necessary coördination is obtained falls properly under the consideration of the method of operation. It is believed that this operation can be taken up most conveniently under several main headings, although it is to be understood that if other combinations of movements than those described can be effected, the invention is not to be limited by a failure to mention such other combinations in this description.

Starting.

Rotation of the turn-table $c$ may be initiated manually by operation of the starting lever $p^8$ in the usual manner, the effect of operation of this lever in one direction being to collapse the brake pneumatic $p$ and retract the brake $p'$ from the disk $b^2$ and bring about the engagement of the detent $p^3$ with the holding stud $p^4$.

The same collapse may be brought about automatically by pressing one of the starting buttons $l^2$ which, as indicated before, may be mounted either on the cabinet $a$ or carried some distance therefrom to any convenient part of the room. When the button $l^2$ is pressed the circuit is closed through the local battery L and the electromagnet $l'$ thereby causes the detent arm $l$ of this magnet to swing and release the motor knife switch $i'$, whereupon this switch falls into closed position and completes the circuit of the motor $i$. Operation of this motor drives the pump $k$ and the brake pneumatic $p$ is immediately collapsed through the direct suction introduced therein from the pump through the conduit $k^2$. Rotation of the turn-table $c$ is thus brought about.

Stopping.

When rotation of the turn-table $c$ is to be stopped, the manually controlled lever $p^8$ may be swung to collapse the tripping pneumatic $p^5$ so as to bring the stud $p^6$ into operative relation to the spring detent $p^3$ and thereby release this detent from its holding stud $p^4$ and permit the brake pneumatic $p$ to expand and apply the brake $p'$. The collapse of the tripping pneumatic $p^5$ may be effected automatically through the stopping button $l^3$. The effect of closing the stopping switch $l^3$ is to energize the electromagnet $t^6$ whereby the arm $t^5$ with the primary valve $t^4$ is swung to unseat the primary valve and thereby actuate, through the conduit $t^3$, the secondary for the tripping pneumatic $p^5$ in the valve chest $o$, so as to collapse said pneumatic and effect the application of the brake $p'$, as described. Another way of stopping rotation of the turn-table $c$ is through the unseating of the primary valve $t$ on the throw pneumatic $q^9$ through its engagement by the fixed abutment $t'$ on the movable member of said pneumatic. This primary controls the secondary for the trip pneumatic $p^5$ in the valve chest $o$ through the conduits $t^2$, $t^3$. The stoppage is always effected in this manner after a record has been played, except when continuous playing is desired, in which instance this throw pneumatic is cut out of the pneumatic system and the turn-table $c$ rotates without stoppage.

Lifting and repositioning the needle $d'$.

The needle $d'$ is lifted from the face of the record as soon as the record has been played and remains lifted until the tone arm $e$ has been swung to initial position, whereupon the bellows $m$ expands and the sound box drops until its movement is arrested by engagement of the needle with the face of the record therebeneath. The needle rests on the record and thereby limits the downward movement of the swiveled sound box as the records are successively removed. From this, it will be evident that it is desirable to have the needle $d'$ raised whenever any of the other devices come into play and, accordingly, the lifting pneumatic $m$ for the needle $d'$ is connected directly to the pump $k$ through the conduit $k'$ and is collapsed whenever the pump is started. This collapse raises the needle $d'$ from the face of the record and as soon as the pump $k$ is stopped, the pneumatic $m$ expands and lowers the needle to the face of the record. When the needle $d'$ is lifted after a record has been played, it must be repositioned for the playing of the next piece and this repositioning is effected by swinging the tone arm $e$ while the needle is thus raised. This swinging should not be started, of course, until the needle is raised and, accordingly, the valve $o^2$ which controls the suction for the repositioning pneumatic $e^5$ is not swung to operative position until the lifting pneumatic $m$ has collapsed. As soon as the valve $o^2$ is swung to operative position, the repositioning pneumatic $e^5$ is collapsed and the tone arm is swung to bring the needle to its initial position. The outward swinging of the tone arm $e$ may be limited conveniently by a spring buffer $u$, in a manner which will be understood. In series with the repositioning pneumatic is the pneumatic $f^4$ for raising the finder arm $f$ at the end of a record and repositioning it at the same time that the tone arm $e$ is swung back to initial position.

Shifting.

The shifting of a record from the turn-table is effected after the record has been played by means of the shifter arm $g$. The finger $g'$ on this arm $g$ is normally held above the face of the record by the support $q$. When a record has been played, the tone arm $e$ engages the finder arm $f$ and completes the circuit through the controlling magnet $l'$ for the motor switch $i'$, thereby bringing about operation of the pump $k$ in the manner heretofore described. Immediately thereupon suction is placed in the supporting pneumatic $q^3$ for the support $q$ through the conduits $k'$, $q^4$, and the finger $g'$ of the shifting lever $g$ is permitted to drop on to the face of the record to be shifted. Simultaneously, the lifting pneumatic $m$ for the tone arm $e$ has been collapsed. Upon the collapse of this pneumatic, the primary valve $q^{12}$ is unseated by its engagement with the abutment $e^7$ on the lifting rod $e^2$ and atmospheric pressure is placed upon the secondary for the throw pneumatic $g^9$ in the valve chest $o$ through the conduits $g^{13}$ and $g^{14}$. The effect of the actuation of this secondary is to throw the suction of the valve chest $o$ in the throw pneumatic $g^9$ through the conduit $g^{15}$. Upon the collapse of the throw pneumatic $g^9$ the shifting arm $g$ will be given a substantially radial movement with relation to the record through the linkage $g^8$ and the record will be thrown into the pocket $h$. During this time the pneumatic $q^3$ is maintained in collapsed position, as described above, so that the finger $g'$ rests on the face of the record. As soon as the suction is removed from the pneumatic system the pneumatic $g^9$ will expand to return the shifting lever $g$ to its normal position, while the supporting pneumatic $q^3$ for the shifting arm $g$ will also expand to raise the finger $g'$ of the said arm from engagement with the face of the record then uppermost.

Repeating.

To replay the same record the throw pneumatic $g^9$ is cut out of the pneumatic system so as to remain inactive and permit the needle $d'$ to be returned to initial position and lowered on to the face of the same record. The stopping primary $t$ on the throw pneumatic $g^9$ is also cut out of the system so that it cannot operate to collapse the tripping pneumatic $p^5$ after the record has been played. The throw pneumatic $g^9$ is cut out of the system by moving the push rod $r$ to its inner position, during which movement one of the studs $r^2$ thereon engages the tail $n^7$ of the throw valve $n^5$ and closes this valve. In this way the primary $g^{12}$ is cut off from the conduit $g^{14}$ by the valve $n^5$ and the corresponding secondary for the throw pneumatic $g^9$ in the valve chest $o$ is not subjected to the atmospheric pressure which otherwise would be admitted thereto past the primary $g^{12}$.

Continuous playing.

For continuous playing the stopping primary $t$ on the throw pneumatic $g^9$ must be cut off from the corresponding secondary in the valve chest by which the tripping pneumatic $p^5$ is controlled. This cut off is effected through the valve $t^7$ which is moved to closed position by drawing the operating handle $r'$ of the pull rod $r$ to its outermost position thereby picking up the arm $t^8$ on the valve $t^7$. Since the throw pneumatic $g^9$ would ordinarily operate whenever the pump $k$ is set in motion, it is necessary, in continuous playing, to cut out the throw pneumatic $g^9$ when the pump $k$ is set in motion to start rotation of the turn-table $c$, otherwise the throw pneumatic would come into play and shift the uppermost record. This cut out, at the commencement of the continuous playing, is effected by pushing the control button $s^2$ for the detent magnet $s'$, thereby setting the detent $s$ in the path of one arm of the supplemental throw valve $n^6$ to hold this valve in closed position against the action of the spring $n^{10}$ when the master bellows $n$ is collapsed at the first operation of the pump $k$. Upon the expansion of the bellows $n$ the detent $s$ is moved out of the path of the arm of the valve $n^6$ by the abutment $n^{13}$ on the rod $n^{11}$ of the master bellows. The succeeding operation of the pump $k$ will find the valves $n^5$ and $n^6$ open to permit operation of the throw pneumatic $g^9$ to shift the uppermost record at the end of the piece, as desired.

The most usual combinations employed will be considered briefly and the appropriate setting therefor pointed out.

To start and repeat the same record without shifting.

The push rod $r$ is moved to its inner position thereby throwing the valve $n^5$ to closed position and cutting off the primary $g^{12}$ for the secondary of the throw pneumatic $g^9$. The starting button $l^3$ is pushed thereby energizing the magnet $l'$ and retracting the detent $l$ to permit the knife switch $i'$ for the motor $i$ to close and bring about the starting of the motor and the pump. The lifting pneumatic $m$ is immediately collapsed to raise the needle $d'$ and the repositioning of the pneumatic $e^5$ for the tone arm $e$ and the positioning pneumatic $f^4$ for the finder arm $f$ come into play to perform their intended functions. As soon as the master bellows $n$ is fully collapsed the projection $n^2$ thereon unseats the primary $n'$ so as to admit atmospheric pressure to the secondary for the motor cut out pneumatic $i^2$ in the valve chest $o$, through the conduit $n^4$. When this secondary is actuated the suction is admitted through the conduit $i^3$ to the motor cut out pneumatic $i^2$ which is thereupon collapsed to raise the switch $i'$ and interrupt the motor circuit $i$, whereupon this motor and the pump $k$ are stopped. All the time, however, suction is maintained throughout the system by the expanding master bellows $n$, the chamber of which is in communication with the valve chest through a conduit N which is the main suction conduit. The operation of the pump $k$ serves to collapse the brake pneumatic $p$ and start rotation of the turn-table $c$. Upon the expansion of the lifting pneumatic $m$ the needle $d'$ will be lowered to the record for playing. At the end of the record the tone arm $e$ will make contact with the finder arm $f$ thereby completing the circuit through the magnet $l'$ controlling the detent $l$ for the motor switch $i'$, thereby initiating operation of the pump $k$, the collapsing of the lifting pneumatic $m$ and the repeat of the operations first described, the result being the continuous repeating of the same record. If, at any time during the playing of the record, it is desired to have the repeat take place, the starting button $l^2$ may be pushed to bring about the same series of operations. When the playing is to be stopped, the starting button $l^2$ is pushed to start the motor and the stopping button $l^3$ is pushed, thereby energizing the stop magnet $t^6$, unseating the primary $t^4$ and actuating the secondary for the tripping pneumatic $p^5$, all as described.

*To play a record, shift it, reposition the needle and then stop.*

The throw valve $n^5$ must be closed at first to cut out the throw pneumatic $g^9$ so that upon the first operation of the pump $k$, as to start rotation of the turn-table $c$, the throw devices will not shift the record which is to be played. Accordingly, the push rod $r$ is thrown to its inner position thereby closing the valve $n^5$ through the engagement of the pin $r^2$ with the tail $n^7$ of said valve. However, the throw pneumatic $g^9$ cannot be left out of the circuit if the record is to be thrown automatically as soon as played. For this reason, provision is made for automatically cutting the throw pneumatic $g^9$ into the circuit as soon as rotation of the turn-table $c$ has been started. This provision is met by the recess $r^3$ in the push rod $r$ and the spring $n^8$ on the movable member of the master bellows $n$. After the valve $n^5$ has been closed by pushing the rod $r$ to its inner position, as described, this rod is immediately retracted to its median position, without disturbing the valve $n^5$, in which position the spring $n^8$ rests in the recess $r^3$ with its tip in operative relation to the valve $n^5$. With the parts thus set, the starting button $l^2$ is pushed to energize the controlling magnet $l'$ for the detent $l$ of the starting switch $i'$ and thereby effect actuation of the pump $k$ in the manner now understood. Immediately the master bellows $n$ will be collapsed, the pneumatics $m$, $e^5$ and $f^4$ will also be collapsed to effect their intended functions, as pointed out more particularly hereinbefore, the primary $n'$ will be unseated to collapse the motor cut out pneumatic $i^2$ and the operation of the pump will be interrupted at the proper time as pointed out before. By closing the valve $n^5$ through the push rod $r$ the throw primary $g^{12}$ is rendered inactive so that the throw pneumatic $g^9$ is cut out of the system. After the needle $d'$ has been lowered to the record and the piece is being played the master bellows $n$ will slowly expand, eventually bringing the hook $n^8$ in engagement with the reverse bevel face of the throw valve $n^5$ and swinging this valve from closed position to opened position as will appear from Fig. 7. At the end of the record the tone arm $e$ engages the finder arm $f$ and closes the circuit of the controlling magnet $l'$ whereupon the motor switch $i'$ will close and the pump $k$ will be started to lift the needle $d'$ from the record and collapse the repositioning pneumatic $e^5$ to bring the needle to initial position. Upon the collapsing of the lifting pneumatic $m$ the throw primary $g^{12}$ will be opened and since the throw valve $n^5$ is in opened position by the automatic engagement therewith of the pull rod $n^8$ on the master bellows $n$, as pointed out, the secondary of the throw pneumatic $g^{12}$ will be actuated to bring about the collapse of this pneumatic and the shifting of the record as described. When the record has been shifted and after the repositioning has occurred, the stopping primary $t$ on the throw pneumatic $g^9$ will be unseated and the secondary for the tripping pneumatic $p^5$ will be actuated to effect the collapse of this tripping pneumatic and the stoppage of the turn-table $c$ as pointed out hereinbefore.

*To play a series of superposed records continuously.*

To effect this operation, it will be evident that the throw pneumatic $g^9$ must be cut out of the system at the very commencement of the playing in order that the uppermost record will not be shifted before it is played. However, after the playing has started, the throw pneumatic $g^9$ must operate at the end of each record to shift it so that the next succeeding record may then be played. Again it is evident that the stop primary $t$ on the throw pneumatic $g^9$ must be cut out during the entire playing, so that it will not serve to bring about actuation of the tripping pneumatic $p^5$ whenever the throw pneumatic $g^9$ collapses. The push rod $r$ is moved to its outer position through the handle $r'$ and this handle picks up the arm $t^8$ on the valve $t^7$ so as to close this valve and thereby cut off the primary $t$ from the conduit $t^3$ which leads to the secondary for the trip pneumatic $p^5$. The effect of pulling the pull rod $r$ to its outer position is to open the throw valve $n^5$ by the engagement of one of the pins $r^2$ with the tail $n^7$ of said valve. In order to prevent the throw devices from coming into play when the starting button $l^2$ is first pushed, the button $s^2$ for the detent magnet $s'$ is pushed to energize the magnet and thereby throw the detent $s'$ into the path of one arm of the valve $n^6$. With the parts in the positions described, the starting button $l^2$ is pushed thereby energizing the controlling magnet $l'$ and effecting operation of the motor $i$ and pump $k$ as will be understood. The usual operations of the pneumatics $m$, $e^5$, $f^4$ and $p$ will occur in proper sequence to bring about the commencement of the playing of the uppermost records. Upon the collapsing of the master bellows $n$ and the release of the bell crank $n^9$ on the valve $n^6$, rocking of this arm to open the supplemental throw valve $n^6$, under the action of the spring $n^{10}$ will be prevented by engagement of one of the arms of the bell crank with the detent $s'$. By thus preventing positively the opening of the supplemental throw valve $n^6$ the primary $g^{12}$ for the throw pneumatic $g^9$ will remain cut off from the corresponding secondary in the valve chest $o$, so that the throw pneumatic will not be operated. Upon the subsequent expansion of the master bellows $n$ the detent $s'$ will be picked up by the abutment $n^{13}$ and moved out of the path of the bell crank $n^9$ so that the latter will be free to rock under the action of the spring $n^{10}$ upon the succeeding collapse of the master bellows. As soon as the uppermost record has been played the tone arm $e$ will come into contact with the finder arm $f$ and complete the circuit of the magnet $l'$ thereby bringing about operation of the pump $k$ for the purpose of creating a vacuum throughout the system and collapsing the several pneumatics to raise the needle $d'$, return it to initial position, reposition the finder arm $f$, lower the finger $g'$ on the shifting lever $g$ to face of the uppermost record, and finally throw this shifting lever $g$ inward radially to discharge the uppermost record. When the master bellows $n$ is collapsed the projection $n^2$ thereon unseats the primary $n'$ to bring about the collapse of the motor cut out pneumatic $i^2$ and interruption of the circuit of the motor $i$. Subsequent expansion of the master bellows $n$ serves to sustain the suction in the pneumatic system for at least a sufficient length of time, even after the stoppage of the pump $k$, to insure the completion of the movements of the several pneumatics and the proper performance of their intended functions. The next record is then played and shifted, and so the playing is continued until all of the records have been played. Obviously, with the setting given for continuous playing the operation of the parts might continue even after the lowermost record has been discharged, with consequent injury to the parts of the machine. Since the invention contemplates the provision of what is essentially an automatic graphophone, devices have been provided to guard against such a condition and always insure the automatic stoppage of the graphophone when the last record on the turn-table has been played. Such provision is made by mounting a primary valve T on the cabinet $a$ in juxtaposition to the swinging shifter arm $g$ and the port controlled by this valve communicates with the conduit $t^3$ through a branch conduit T' whereby the secondary for the tripping pneumatic $p^5$ may be controlled by the primary valve T in much the same manner described with relation to the primary valve $t$ on the throw pneumatic $g^9$. The valve T is so constructed as to present an arm which will be engaged by a pin $T^2$, which is carried with one of the swinging fingers $g^2$ on the shifting lever $g$, when, and only when, this finger falls to a certain plane. Since, as has been described, the height of this finger with relation to the turn-table is dependent upon the height of the face of the uppermost record, the valve T has its arm so disposed that when the finger $g^2$ is retracted to normal position after the shifting of the lowermost record, the pin $T^2$ carried with the finger will engage the valve T and rock it so as to place the conduit $t'$ in free communication with the atmosphere and thereby actuate the secondary of the tripping pneumatic $p^5$ and, through it, bring about stoppage of the rotation of the turn-table. This primary T will always be thus actuated when the last record has been shifted from the turn-table.

In the operation of the improved graphophone with any of the settings described, it is, of course, necessary to initiate movement of the devices, either manually through the lever $p^8$ or through the starting button $l^2$ which, as stated, may conveniently be disposed at any part of a room and at a distance, more or less remote from the cabinet. While such a control constitutes a marked improvement in this art and affords a ready means of manipulation, in accordance with the invention, it is proposed to go a step farther and provide, where circumstances make it useful, a supplemental automatic starting device by which initiation of the several movements, with any setting is brought about at a predetermined time and where the setting governs a play and stop, will initiate such movements regularly at predetermined time intervals. Such an automatic starting device will take the place of the starting buttons and make manipulation unnecessary. Since the operation of this automatic starting device is to occur at a predetermined time, it will be evident that the particular means for bringing about its movement at such time, may take widely different forms. However, since the preferred embodiment of the invention has been illustrated as practised entirely by means of controlling pneumatics, the movement of which is initiated by electrical devices, it has been elected to illustrate and describe an expansible pneumatic for effecting automatically the time interval playing control. This pneumatic, indicated at $v$, is connected directly to the pump $k$ through a conduit $v'$, so that immediately upon actuation of the pump $k$ the pneumatic $v$ will be collapsed and thereby reset. On the movable member of the pneumatic $v$ is carried a terminal $v^2$ which is connected through a lead $v^3$ in parallel with the circuit of the finder arm $f$. Mounted in spaced relationship to the movable member of the pneumatic $v$ is a second terminal $v^4$ shown as a cam which is connected, as through a lead $v^5$, in parallel with the circuit of the tone arm $e$. By reason of the cam shape of the terminal $v^4$ it is evident that the distance between its edge and the terminal $v^2$ when the pneumatic $v$ is collapsed may be adjusted by rotation of the cam as through a handle $v^6$ provided for this purpose. The pneumatic $v$ is provided with a relatively restricted bleed needle whereby the pneumatic expands very slowly and at a predetermined rate. With the devices above described, set for any desired series of operations, the cam $v^4$ may be rotated to bring its surface at a predetermined distance from the terminal $v^2$. Upon the expansion of the pneumatic $v$, the terminal $v^2$ will be carried into engagement with the cam $v^4$ at a predetermined time, thereby closing the circuit of the tone arm $e$ and finder arm $f$ and energizing the magnet $l'$ to bring about operation of the motor $i$ and the other operations provided by the supplemental pneumatics, in exactly the way described in connection with the pushing of the starting button $l^2$ and with the engagement of the tone arm $e$ with the finder arm $f$, as at the end of a record. As soon as the pump $k$ is thus started the time interval pneumatic $v$ will be collapsed by the suction in the conduit $v'$ and thereby reset. After the record has been played and rotation of the turn-table $c$ stopped, if the devices are so set, the contact $v^2$ will eventually be brought into engagement again with the contact $v^4$ and the same operations will be repeated. In this way, periodically, at fixed time intervals, a record will be played automatically. It is important to note, in this connection, that the minimum time required for the pneumatic $v$ to expand to bring the contact $v^2$ in engagement with the cam $v^4$ must be greater than the time required for the playing of a record, otherwise the time interval playing device would become operative too soon and the playing of the record would be interrupted prematurely and the sequence of operations disturbed. For the purpose of preventing such premature playing and also to afford a ready means of cutting out this time interval device, the cam $v^4$ throughout a portion of its cam surface has an insulating strip $v^7$, which may be thrown into position to be engaged by the moving contact $v^2$ and without permitting the circuit to be completed through the leads $v^3$, $v^5$. Where this time interval is employed for bringing about automatically the playing successively of superposed records at predetermined time intervals, it is evident that contact between the terminal $v^2$ and the cam $v^4$ would be made periodically even after the discharge of the last record, so that the pump $k$ would be started and the supplemental devices operated, perhaps, with some injury to the parts. Accordingly, means have been provided to interrupt the circuit through the leads $v^3$, $v^5$, automatically as soon as the lowermost record has been discharged. Such means comprise a switch $v^8$ arranged normally to lie in engagement with a terminal plate $v^9$ to which one of the leads $v^5$ is connected. The switch $v^8$ is itself connected electrically to the circuit of one of the leads to the controlling magnet $l'$. This switch, with the contact plate $v^9$, is conveniently mounted with the stop primary T by which rotation of the turn-table $c$ is stopped automatically upon the discharge of the lowermost record from the turn-table. The switch $v^8$ is of such shape and so disposed as to be engaged by the pin $T^2$ on the finger $g^2$ of the shifting lever $g$ when this pin has been lowered with the finger to a level at which the lowermost record may be engaged, all as described in connection with the operation of the primary valve T by the pin. In this way, after the lowermost record has been shifted, the pin $T^2$ will upon retraction of the finger $g^2$ engage the primary valve T to effect stoppage of the turn-table $c$ and will also engage the switch $v^8$ so as to move it out of contact with the contact plate $v^9$ and thereby interrupt the circuit to the terminals $v^2$, $v^4$ of the time interval playing device.

In Fig. 14, is shown an improvement of merit which, being susceptible of control through electrical devices, and at a distance from the cabinet, if desired, completes a machine having that degree of ready control, largely automatic in character, which this invention contemplates. In this figure there is shown a sound damper $w$, mounted in the sound channel $a^3$ of the cabinet $a$ and this damper is movable to opened or closed position by electromagnets $w'$, the armature $w^2$ of which is connected to a pull rod $w^3$, on the free end of which is formed a hook $w^4$ adapted to ride alternately on reversely beveled surfaces $w^5$ of a segment $w^6$ carried with the damper $w$. The leads $w^7$ of the electromagnet $w'$ may be carried to a push button disposed at any desired place. By energizing the magnets $w'$, the pull rod $w^3$ is moved axially to swing the damper $w$ from one position to another according to its condition, thereby dampening the sound or permitting its uninterrupted passage, as may be desired. In order to cushion the movement of the damper and its operating parts there is connected with the pull rod $w^3$ a cushioning pneumatic $w^8$ and guide spring $w^9$ the effect of which will be of known character.

This invention has been described largely without reference to the particular details of construction of the mechanical devices by which the movement of the various pneumatics are transmitted to the elements to be actuated or by which the setting or control of any of the parts of the system, either electrical or pneumatic, is effected, since all such mechanical devices may take different forms and be satisfactory for bringing about the functioning of the pneumatics and magnets in the intended manner. However, it is to be kept in mind, that in a phonograph of this character, intended to be automatic, it is important that the control and actuating parts be so coördinated and arranged for coöperation as to bring about, in any desired combinations, and in proper sequence, the desired operations of the machine.

Reference is to be had to the appended claims for a determination of the scope of the invention.

I claim as my invention:

1. In combination with a graphophone, pneumatic devices to control the operation thereof, a pump to actuate the pneumatic devices, an electrical motor to drive the pump, devices to control the starting of the motor, and independent devices the operation of which is initiated by the operation of the pneumatic devices to stop the motor immediately upon actuation of said pneumatic devices.

2. In combination with a graphophone, pneumatic devices to control the operation thereof, a pump to actuate the pneumatic devices, an electrical motor to drive the pump, electromagnetic devices for controlling the starting of the motor, and independent pneumatic devices the operation of which is initiated by the operation of the first named pneumatic devices to stop the motor automatically upon actuation of said pneumatic devices.

3. In combination with a graphophone, and its turn-table, pneumatic devices to control the starting and stopping of the turn-table, a pump to actuate the pneumatic devices, an electrical motor to drive the pump and electrical devices operable automatically at the end of the record to start the motor.

4. In combination with a graphophone and its turn-table, pneumatic devices to control the starting and stopping of the turn-table, a pump to actuate the pneumatic devices, an electrical motor to drive the pump, electrical devices operable automatically at the end of the record to start the motor, and pneumatic devices operable automatically after actuation of said pneumatic devices at the end of the record to stop the motor.

5. In combination with a graphophone, a pneumatic device to lift the needle from the record after it has been played, an independent pneumatic device to swing the needle to initial playing position after it has been lifted, pneumatic means to actuate said pneumatic devices and a valve interposed in the connection between the pneumatic means and the second named pneumatic device and operable automatically upon the collapse of the first named pneumatic device to place the second named pneumatic device in communication with said pneumatic means.

6. In combination with a graphophone having a turn-table, pneumatic devices to control the operation thereof, a pump to actuate the pneumatics, an electric motor to drive the pump, electrical means to start the motor, a tone arm and a finder arm connected in the circuit of said electrical means, said finder arm being positioned automatically by rotation of the turn-table and said tone arm being adapted to engage the finder arm at the end of the record to initiate operation of the electrical means.

7. In combination with a graphophone having a turn-table, pneumatic devices to control the operation thereof, a pump to actuate the pneumatics, an electric motor to drive the pump, electrical means to start the motor, a tone arm and a finder arm connected in the circuit of said electrical means, said finder arm being positioned automatically by rotation of the turn-table, and said tone arm being adapted to engage the finder arm at the end of the record to initiate operation of the electrical means, and an independent pneumatic connected operatively to the pump to reposition the finder arm upon actuation of the electric motor.

8. In combination with a graphophone, a pneumatic device to lift the needle after the record has been played, a pneumatic device to shift the record, pneumatic means to actuate said pneumatic devices and a primary valve operable automatically upon the collapse of the pneumatic lifting device to place the pneumatic shifting device in communication with the pneumatic means.

9. In combination with a graphophone having a turn-table, a pneumatic device to lift the needle from the record after it has been played, a pneumatic device to shift the record, a pneumatic device to control the starting and stopping of the turn-table, pneumatic means to actuate said pneumatic devices, a primary valve operable automatically upon the collapse of the pneumatic lifting device to place the pneumatic shifting device in communication with the pump, and a primary valve operable automatically upon the collapse of the pneumatic shifting device to place the pneumatic stopping device in communication with the pneumatic means.

10. In combination with a graphophone, a shifting arm for the records, a pneumatic operable to position the shifting arm and an independent pneumatic operable to swing the shifting arm after positioning to effect the shifting of the record.

11. In combination with a graphophone, a pneumatic device to lift the needle from the record after it has been played, a pneumatic device to shift the record, pneumatic means to actuate said pneumatic devices, a primary valve operable automatically upon the collapse of the pneumatic lifting device to place the pneumatic shifting device in communication with the pneumatic means, and means to cut out the pneumatic shifting device.

12. In combination with a graphophone, a pneumatic device to lift the needle from the record after it has been played, a pneumatic device to shift the record, a pump to actuate said pneumatic devices, a primary valve operable automatically upon the collapse of the pneumatic lifting device to place the pneumatic shifting device in communication with the pump and a valve disposed between said primary and its secondary for interrupting the communication therebetween and cutting out the pneumatic shifting device.

13. In combination with a graphophone having a turn-table, a pneumatic device to control the starting and stopping of the turn-table, a pneumatic device to shift the record, pneumatic means to actuate said pneumatic devices and a primary valve operable automatically upon the collapse of the pneumatic shifting device to place the pneumatic stopping device in communication with the pneumatic means.

14. In combination with a graphophone having a turn-table, pneumatic devices to control the starting and stopping of the turn-table, a pneumatic device to shift the record, pneumatic means to actuate said pneumatic devices, a primary valve operable automatically upon the collapse of the pneumatic shifting device to place the stopping pneumatic in communication with the pneumatic means and devices to cut out the pneumatic stopping device.

15. In combination with a graphophone having a turn-table, a pneumatic device to control the starting and stopping of the turn-table, a pneumatic device to shift the record, pneumatic means to actuate said pneumatic devices, a primary valve operable automatically upon the collapse of the pneumatic shifting device to place the pneumatic stopping device in communication with the pneumatic means and a valve disposed between said primary and its secondary for interrupting communication therebetween to cut out the stopping devices.

16. In combination with a graphophone, a pneumatic device to shift the records, a pump to actuate said pneumatic device, a valve to cut out said pneumatic shifting device and independent pneumatic devices operable after one operation of said pump to open said valve automatically.

17. In combination with a graphophone adapted for continuous playing, a pneumatic device to lift the needle from the record after it has been played and reposition it, a pneumatic device for shifting the records, a pump to actuate said pneumatic devices, and electrically controlled means for cutting out said pneumatic shifting device at the first operation of the pump.

18. In combination with a graphophone adapted for continuous playing, a pneumatic device to lift the needle from the record after it has been played and reposition it, a pneumatic device for shifting the records, a pump to actuate said pneumatic devices, electrically controlled means for cutting out said pneumatic shifting device at the first operation of the pump, and pneumatic devices to restore the communication between said shifting pneumatic and the pump after the said first operation.

19. In combination with a graphophone adapted for continuous playing, a pneumatic device to lift the needle from the record after it has been played and reposition it, a pneumatic device to shift the records, a pump to collapse said pneumatic devices and electrical means operable automatically at the end of each record to initiate operation of said pump.

20. In combination with a graphophone adapted for continuous playing and having a turn-table, a pneumatic device to lift the needle from the record after it has been played and reposition it, a pneumatic device to shift the records, a pump to collapse said pneumatic devices, electrical means operable automatically at the end of each record to initiate operation of said pump, and means operable automatically after the shifting of the last record for stopping rotation of the turn-table.

21. In combination with a graphophone having a turn-table, pneumatic devices to control the starting and stopping of the turn-table, a pneumatic device to shift the records, pneumatic means to actuate said pneumatics, a primary valve operable automatically upon the collapse of the shifting pneumatic to place the stopping pneumatic in communication with the pneumatic means, and independent electromagnetic devices operable at the will of the operator to place said stopping devices in communication with the pneumatic means.

22. In combination with a graphophone having a turn-table, a pneumatic device to control the starting and stopping of the turn-table, a pneumatic device for shifting the records, pneumatic means to actuate said pneumatic devices, a valve to cut out the pneumatic shifting device, a primary valve operable automatically upon the collapse of the pneumatic shifting device to place the stopping pneumatic in communication with the pneumatic means, an independent valve to interrupt the communication between the said primary valve and the corresponding secondary, and manually operable means operatively engaged with the cut out valve for the pneumatic shifting device and the cut out valve for the primary to open the cut out valve for the shifting pneumatic and simultaneously close the cut out valve for the primary, to permit continuous playing.

23. In combination with a graphophone having a turn-table, a pneumatic device to control the starting and stopping of the turn-table, a pneumatic shifting device for the records, pneumatic means to actuate said pneumatic devices, a valve to cut out the shifting pneumatic, a primary valve operable automatically upon the collapse of the pneumatic shifting device to place the stopping pneumatic in communication with the pneumatic means, an independent valve to interrupt the communication between the said primary valve and the corresponding seondary, manually operable means operatively engaged with the cut out valve for the pneumatic shifting device and the cut out valve for the primary to open the cut out valve for the pneumatic shifting device and simultaneously close the cut out valve for the primary, to permit continuous playing, and an independent primary valve communicating with the secondary of said first named primary valve and operable automatically upon the shifting of the last record to place the stopping pneumatic in communication with the pneumatic means.

24. In combination with a graphophone having a turn-table, pneumatic devices to control the starting and the stopping thereof, a pneumatic device to shift the record after playing, a pneumatic device to lift the needle from the record played, a pump to collapse said pneumatic devices, a motor to drive the pump, electrical means for initiating operation of the motor to start the playing, and electrical means operable automatically after the record has been played to initiate operation of the motor for the shifting and stopping .

25. In combination with a graphophone having a turn-table, pneumatic devices to control the starting and stopping thereof, a pneumatic device to shift the record after playing, a pneumatic device to lift the needle from the record played, pneumatic means to collapse said pneumatic devices, a motor to drive the pump, electrical means for initiating operation of the motor to start the playing, electrical means operable automatically after the record has been played to initiate operation of the motor for the shifting and stopping, and independent pneumatic devices connected to the pneumatic means to stop the motor after actuation of said pneumatic devices.

26. In combination with a graphophone having a turn-table, pneumatic devices to control rotation of the turn-table, pneumatic devices to control the positioning of the needle with respect to the record, pneumatic devices to shift the records, a pump to collapse said pneumatics, valves to place certain of said pneumatic devices in communication with the pump automatically to cause sequential operations, and electrical means to initiate operation of said pump at predetermined times.

This specification signed this 23rd day of June, A. D. 1916.

JOHN A. WESER.